US012738667B2

(12) United States Patent
Jang et al.

(10) Patent No.: US 12,738,667 B2

(45) Date of Patent: Sep. 15, 2026

(54) HYBRID HIGH GAIN ANTENNA ARRAY

(71) Applicant: JOHN MEZZALINGUA ASSOCIATES, LLC., Liverpool, NY (US)

(72) Inventors: Taehee Jang, Allen, TX (US); Gilberto Guerra Arias, McKinney, TX (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 116 days.

(21) Appl. No.: 18/697,671

(22) PCT Filed: Feb. 14, 2024

(86) PCT No.: PCT/US2024/015685

§ 371 (c)(1),
(2) Date: Apr. 1, 2024

(87) PCT Pub. No.: WO2024/173465

PCT Pub. Date: Aug. 22, 2024

(65) Prior Publication Data

US 2025/0260177 A1 Aug. 14, 2025

Related U.S. Application Data

(60) Provisional application No. 63/485,052, filed on Feb. 15, 2023.

(51) Int. Cl.

*H01Q 21/06* (2006.01)
*H01Q 5/48* (2015.01)

(Continued)

(52) U.S. Cl.

CPC ............. *H01Q 21/062* (2013.01); *H01Q 5/48* (2015.01); *H01Q 9/285* (2013.01); *H01Q 19/108* (2013.01)

(58) Field of Classification Search

CPC ........ H01Q 21/062; H01Q 5/48; H01Q 9/285; H01Q 19/108

See application file for complete search history.

(56) References Cited

U.S. PATENT DOCUMENTS 4,464,663 A * 8/1984 Lalezari ............... H01Q 21/065 343/846
5,966,102 A * 10/1999 Runyon ................. H01Q 21/08 343/820

(Continued)

FOREIGN PATENT DOCUMENTS

CN 114122686 A * 3/2022 ............... H01Q 5/48
CN 119495926 A * 2/2025 ......... H01Q 21/0006
SE 544556 C2 * 7/2022 ........... H01Q 25/002

*Primary Examiner* — Seokjin Kim

(74) *Attorney, Agent, or Firm* — BRYAN CAVE LEIGHTON PAISNER LLP

(57) ABSTRACT

A hybrid multiport array antenna comprises a plurality of columns of hybrid dipole unit cells, each of the hybrid dipole unit cells having a first dipole of a first type, and a second dipole of a second type, wherein the first dipole of the first type and the second dipole of the second type are configured to receive a single pair of RF (radio frequency) signals, the pair of RF signals having two orthogonal polarization states, wherein the first dipole of the first type and the second dipole of the second type are spaced with an offset in a vertical direction. The arrangement of the hybrid dipole unit cells reduces the phase center distance between the dipoles in each column and between columns, thereby assuring high gain while reducing grating lobes and other signal gain degradations caused by longer distances between phase centers.

13 Claims, 6 Drawing Sheets

(51) Int. Cl.
*H01Q 9/28* (2006.01)
*H01Q 19/10* (2006.01)

(56) References Cited

U.S. PATENT DOCUMENTS

| | | | | |
|---|---|---|---|---|
| 6,147,648 | A * | 11/2000 | Granholm | H01Q 21/065 343/700 MS |
| 6,211,841 | B1 * | 4/2001 | Smith | H01Q 1/246 343/797 |
| 11,158,956 | B2 * | 10/2021 | Le | H01Q 1/38 |
| 11,239,564 | B1 * | 2/2022 | Stoytchev | H01Q 25/001 |
| 11,476,574 | B1 * | 10/2022 | Abdelmonem | H01Q 3/2694 |
| 11,641,067 | B1 * | 5/2023 | Merola | H01Q 21/0025 455/575.7 |
| 2004/0145526 | A1 * | 7/2004 | Puente Baliarda | H01Q 1/38 343/893 |
| 2015/0263435 | A1 * | 9/2015 | Song | H01Q 21/26 343/810 |
| 2015/0369905 | A1 * | 12/2015 | Shipley | H01Q 21/225 342/171 |
| 2020/0169009 | A1 * | 5/2020 | Kolitsidas | H01Q 21/062 |
| 2021/0021019 | A1 * | 1/2021 | Hou | H01Q 21/28 |
| 2021/0151873 | A1 * | 5/2021 | Judd | H01Q 1/523 |
| 2021/0218152 | A1 * | 7/2021 | Xiao | H01Q 3/26 |
| 2021/0320399 | A1 | 10/2021 | Bisiules et al. | |
| 2022/0077600 | A1 * | 3/2022 | Sundararajan | H01Q 5/42 |
| 2022/0200164 | A1 * | 6/2022 | Zhu | H01Q 5/48 |
| 2023/0006367 | A1 * | 1/2023 | Varnoosfaderani | H01Q 1/246 |
| 2023/0155649 | A1 * | 5/2023 | Hajimiri | H01Q 3/2605 375/267 |
| 2024/0014573 | A1 * | 1/2024 | Kim | H01Q 21/24 |
| 2024/0304987 | A1 * | 9/2024 | Andersson | H01Q 25/002 |
| 2024/0304988 | A1 * | 9/2024 | Jang | H01Q 1/246 |
| 2024/0429605 | A1 * | 12/2024 | Zhu | H01Q 5/314 |
| 2025/0125540 | A1 * | 4/2025 | Ai | H01Q 1/246 |

* cited by examiner

HYBRID HIGH GAIN ANTENNA ARRAY

CROSS-REFERENCE TO RELATED APPLICATIONS

This application is a National Stage Application of International Application No. PCT/US24/15685 filed on Feb. 14, 2024, which claims the benefit of U.S. Provisional Application No. 63/485,052, filed on Feb. 15, 2023, all of which are incorporated by reference in their entirety herein.

BACKGROUND OF THE INVENTION

Modern cellular antennas typically operate in three frequency bands: low band (LB) (617-896 MHz), mid band (MB) (1695-2690 MHz), C-Band and CBRS (Citizens Broadband Radio Service) (3.4-4.2 GHz). For each of these bands, antennas are required to operate with multiple signals. Common use of the C-Band involves the use of an 8T8R (Eight Transmit Eight Receive) array configuration.

FIG. 1 illustrates a conventional high gain 8T8R array configuration 100. Array 100 has eight columns of C-band dipoles 110 arranged into four columns 105*a*, 105*b*, 105*c*, 105*d*, each having two adjacent columns of dipoles 110. Laterally adjacent dipoles in each of columns 105*a-d* are coupled to a two independent signal sources, one per polarization. Accordingly, with this configuration, array 100 radiates eight distinct RF (Radio Frequency) signals, four per polarization. Array 100 may also have adjacent vertical dipoles 110 arranged in five rows of identically fed dipole clusters (pairs of rows) Each of these clusters may be fed their corresponding signals with a distinct amplitude and phase shift, as provided by a RET (remote electrical tilt) mechanism (not shown) to provide for tilting (i.e., electrically steering) of the antenna beam associated with each column's 105*a-d*) at a distinct tilt angle in the vertical plane defined by the y-axis and z-axis.

Given that each column 105*a-d* comprises two side-by-side dipoles 110, the phase center spacing between columns 105*a-d* is 84 mm in this typical example. This phase center distance is relatively long, causing grating lobes to be formed that contaminate the array's gain and beam quality.

Accordingly, what is needed is a high gain array, such as a C-Band 8T8R array, that has high gain while mitigating grating lobes endemic to conventional solutions.

SUMMARY OF THE INVENTION

An aspect of the present disclosure involves a multiport array antenna. The multiport array antenna comprises a plurality of columns of hybrid dipole unit cells, each of the hybrid dipole unit cells having a first dipole of a first type, and a second dipole of a second type, wherein the first dipole of the first type and the second dipole of the second type are configured to receive a single pair of RF (radio frequency) signals, the pair of RF signals having two orthogonal polarization states, wherein the first dipole of the first type and the second dipole of the second type are spaced with an offset in a vertical direction.

Throughout this disclosure, the terms "vertical direction" and "horizontal directions" are used. It will be understood that these terms are not intended to be construed as absolute. Thus, "vertical direction" is not intended to mean in an absolute up or down direction; rather, it is intended to include reasonable variations from absolute vertical as understood by those skilled in the art at the time of this disclosure. For example, the vertical direction may allow for an antenna to be mounted at a tilt angle around the x-axis. Likewise, "horizontal direction" is not intended to mean absolute level; rather, it is intended to include reasonable variations from absolute level as understood by those skilled in the art at the time of this disclosure.

In another aspect of the present disclosure, a multiport antenna comprises a plurality of dipole columns, each dipole column having a first sub-column having first dipoles of a first type and a second sub-column having second dipoles of a second type, wherein the first dipoles of the first type and the second dipoles of the second type are configured to radiate in a first frequency band, wherein the first dipoles of the first type within a corresponding first sub-column and the second dipoles of the second type within a corresponding second sub-column are coupled to a common signal source.

DETAILED DESCRIPTION OF THE INVENTION

Figure 1:
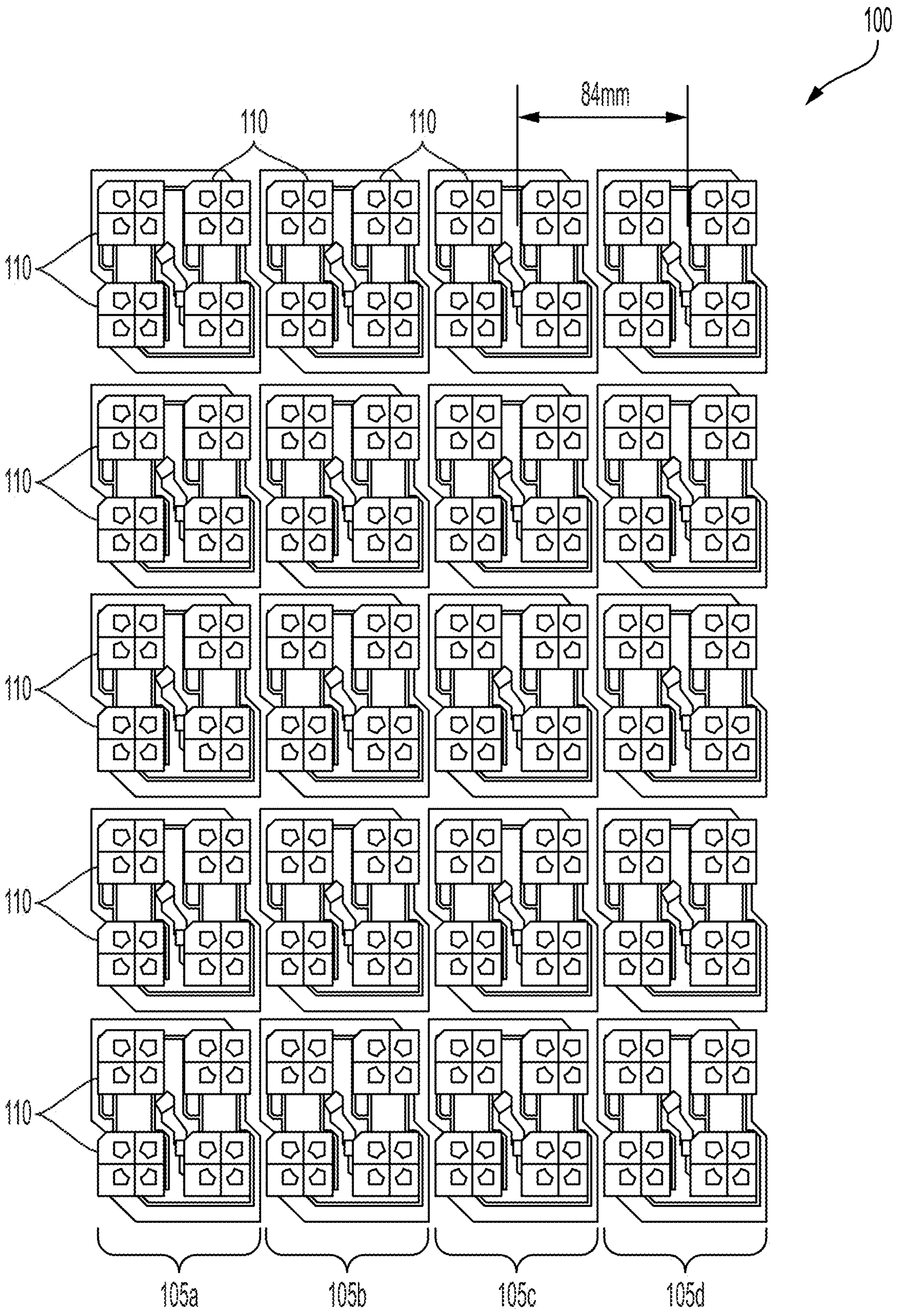
FIG. 1 illustrates a high gain 8T8R C-Band array.
Figure 2A:
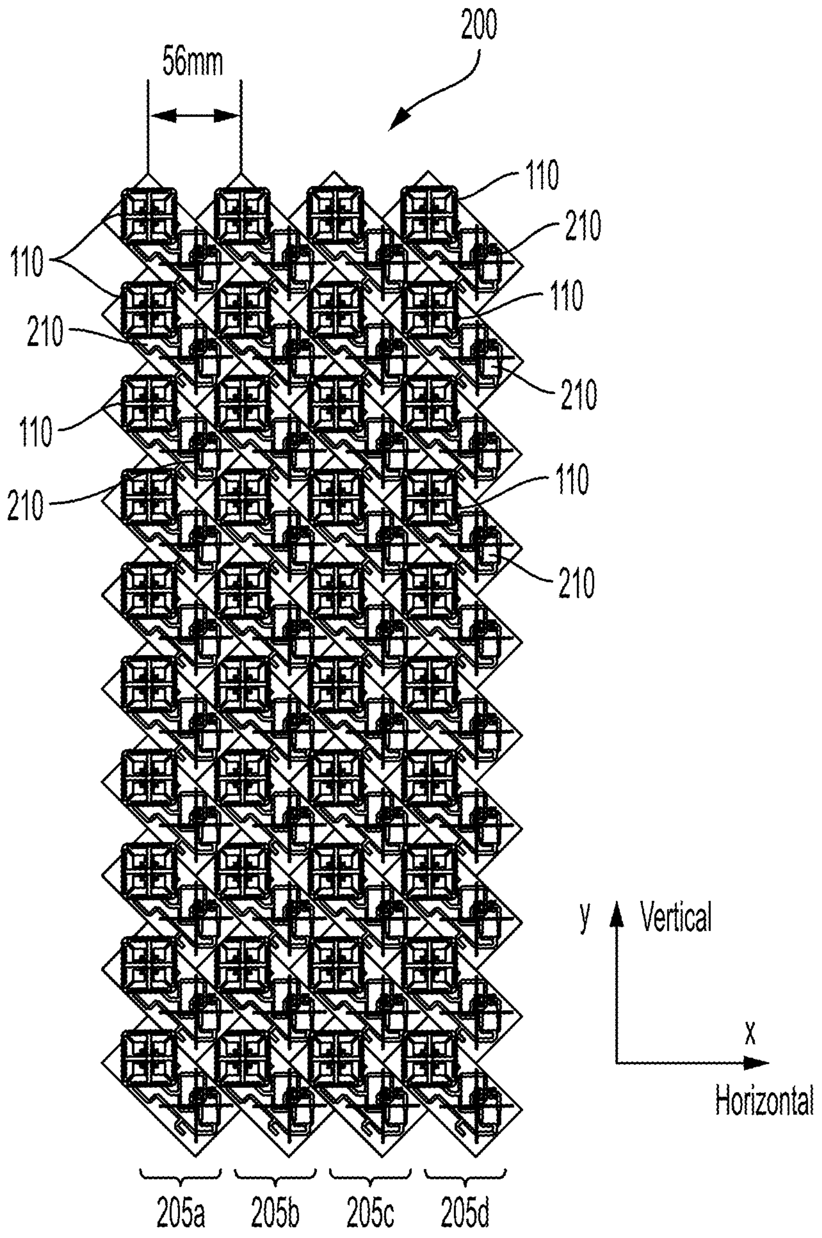
FIG. 2A illustrates an exemplary hybrid high gain 8T8R array according to the disclosure.

FIG. 2A illustrates an exemplary hybrid high gain 8T8R array 200 according to the disclosure. Hybrid array 200 has four first columns of first C-Band dipoles 110 and four interlaced second columns of second C-Band dipoles 210 that are arranged in merged dipole columns 205*a*, 205*b*, 205*c*, and 205*d*. As illustrated, each of exemplary merged dipole columns 205*a-d* has ten hybrid dipole unit cells, each of which are arranged diagonally and having one first dipole 110 and one second dipole 210. With the diagonal orientation of each hybrid dipole unit cell and the use of a first dipole 110 and second dipole 210 in alternating columns, phase center spacing may be reduced. In this example, the phase center spacing may be 56 mm. This sharp reduction in phase center spacing substantially mitigates the grating lobes characteristic of array 100. As illustrated, merged dipole columns 205*a-d* are arranged along a horizontal axis.

Figure 2B:
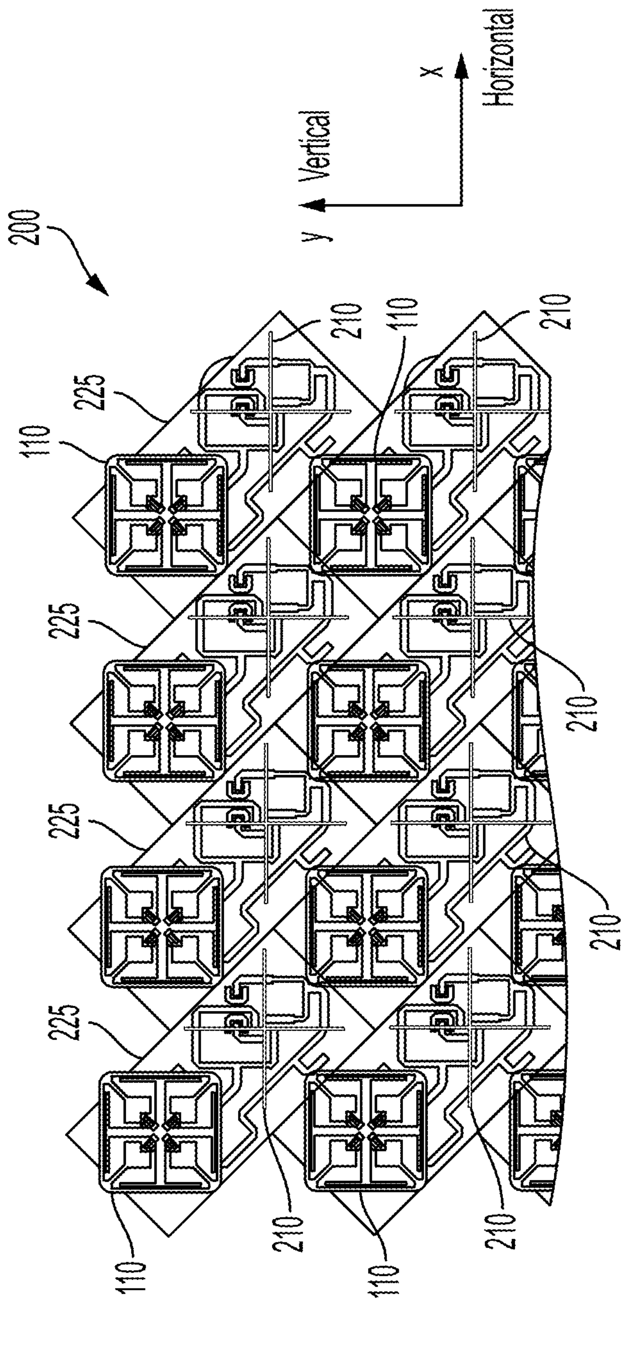
FIG. 2B is a zoomed in view of the exemplary hybrid high gain 8T8R array of FIG. 2A.

FIG. 2B is a zoomed in view of FIG. 2A, showing eight hybrid dipole unit cells 225, each having one first dipole 110 and one second dipole 210. Each of the first dipole 110 and second dipole 210 of each hybrid dipole unit cell 225 is fed two RF signals, one per polarization. Each hybrid dipole unit cell 225 in a given column is fed the same two RF signals.

Figure 3:
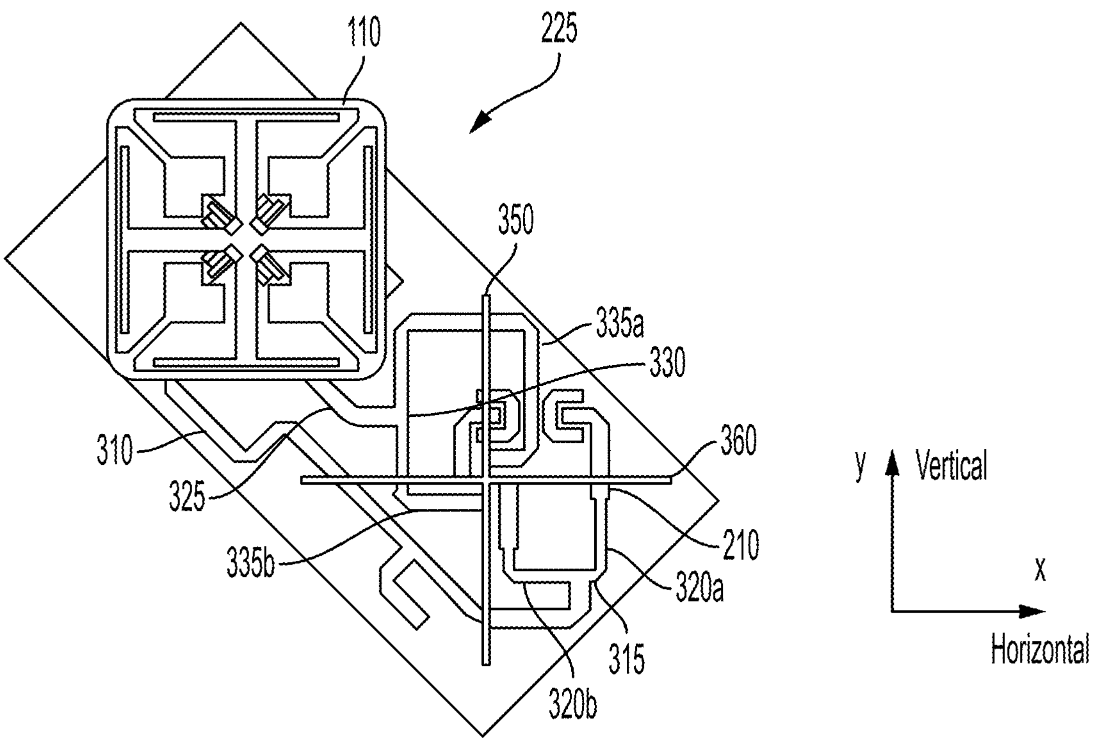
FIG. 3 illustrates an exemplary hybrid dipole unit cell, along with an exemplary feed network, according to the disclosure

FIG. 3 illustrates a single hybrid dipole unit cell 225 according to the disclosure. Hybrid dipole unit cell 225 has a single first dipole 110 and a single second dipole 210 having a vertical stem panel 350 and a horizontal stem panel 360; a first signal feed 310 that couples a first RF signal (e.g., +45 degree polarization) to the appropriate dipole arms of first dipole 110; and a second feed 325 that couples a second RF signal (e.g., −45 degree polarization) to the other dipole arms of first dipole 110. First feed 310, in addition to coupling to first dipole 110, also couples to the appropriate dipole arms (e.g., corresponding to +45 degree polarization) of second dipole 210 via a power divider 315, which splits the RF signal into a first longer trace branch 320*a* and a first shorter trace branch 320*b*. First longer trace branch 320*a* couples to a first side (i.e., the upper side as viewed in FIG. 3) of horizontal stem plate 360 of second dipole 210. First shorter trace branch 320*b* couples to a second side (i.e., the lower side as viewed in FIG. 3) of horizontal stem plate 360 of second dipole 210. The difference in length of first longer trace branch 320*a* and first shorter trace branch 320*b* may be established so that the difference in phase between the RF signal present where first longer trace branch 320*a* is coupled to first side of horizontal stem plate 360 and the RF signal where first shorter trace branch 320*b* is coupled to the second side of horizontal stem plate 360 is 180 degrees. Accordingly, a 180 phase difference between where the signal meets the two sides of horizontal stem plate 360 contributes to a 45 degree rotation of the transmitted signal. What is not shown in FIG. 3 is that a conductor on the first side of horizontal stem plate 360, to which first longer trace branch 320*a* couples, extends to and along a second side (i.e., the left side as viewed in FIG. 3) of vertical stem plate 350 in the positive vertical direction from horizontal stem plate 360. Also not shown in FIG. 3 is that a conductor on the second side of horizontal stem plate 360, to which first shorter trace branch 320*b* couples, extends to and along a first side (i.e., the right side as viewed in FIG. 3) of vertical stem plate 350 in the negative vertical direction from horizontal stem plate 360.

Second feed 325 feeds the second RF signal (e.g., −45 degree polarization) to second dipole 210 via a power divider 330, which splits the second RF signal into a second longer trace branch 335*a* and a second shorter trace branch 335*b*. Second longer trace branch 335*a* couples to the first side of vertical stem plate 350 of second dipole 210. Second shorter trace branch 335*b* couples to the second side of vertical stem plate 350 of second dipole 210. The difference in length of second longer trace branch 335*a* and second shorter trace branch 335*b* may be established so that the difference in phase between the RF signal present where second longer trace branch 335*a* is coupled to the first side of vertical stem plate 350 and the RF signal where second shorter trace branch 335*b* is coupled to the second side of vertical stem plate 350 is 180 degrees. Accordingly, a 180 degree phase difference between where the second RF signal meets the two sides of vertical stem plate 350 contributes to a 45 degree rotation of the transmitted signal. What is not shown in FIG. 3 is that a conductor on the first side of vertical stem plate 350, to which first longer trace branch 335*a* couples, extends to and along the first side of horizontal stem plate 360 in the positive horizontal direction from vertical stem plate 350. Also not shown in FIG. 3 is that a conductor on the second side of vertical stem plate 350, to which second shorter trace branch 335*b* couples, extends to and along the second side of horizontal stem plate 360 in the negative horizontal direction from vertical stem plate 350.

The arrangement of coupling of first longer trace branch 320*a*, first shorter trace branch 320*b*, second longer trace branch 335*a* and second shorter trace branch 335*b*, as well as their respective trace lengths, may feed the two corresponding RF signals to the stem plates 350/360 such that the two RF signals achieve phase shifts sufficient to rotate the polarization of the first and second signals by 45 degrees. Accordingly, although the dipole arms of second dipole 210 are horizontal and vertical (as shown), they radiate the first RF signal at a +45 degree polarization and the second RF signal at a −45 degree polarization. As illustrated, hybrid dipole unit cell 225 may be oriented so that the first dipole 110 and second dipole 210 are positioned with an offset along the vertical (y) axis, enabling them to be located more closely together in the horizontal (x) axis.

This rotation of a radiated signal from horizontal and vertical dipole arms to +/−45 degree radiated energy is also described in co-owned U.S. Pat. No. 11,158,956, INTEGRATED FILTER RADIATOR FOR A MULTIBAND ANTENNA, which is incorporated by reference is if fully disclosed herein.

Figure 4A:
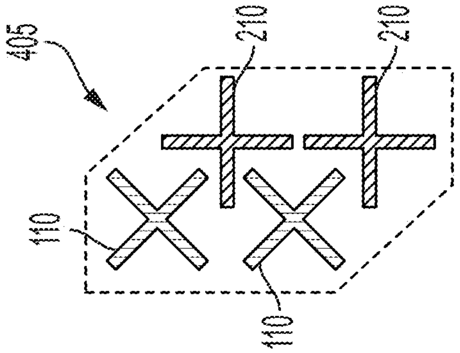
FIG. 4A illustrates a single signal and phase dipole cluster according to the disclosure

FIG. 4A illustrates a single signal and phase dipole cluster 405 according to the disclosure. A signal and phase dipole cluster 405 may have two hybrid dipole unit cells 225, arranged vertically in a given column 205*a/b/c/d*. A given single signal and phase dipole cluster 405 is fed two RF signals (one per polarization), and those two RF signals have a single phase, which means that a single signal and phase dipole cluster 225 is coupled to the output of a single phase shifter (not shown).

Figure 4B:
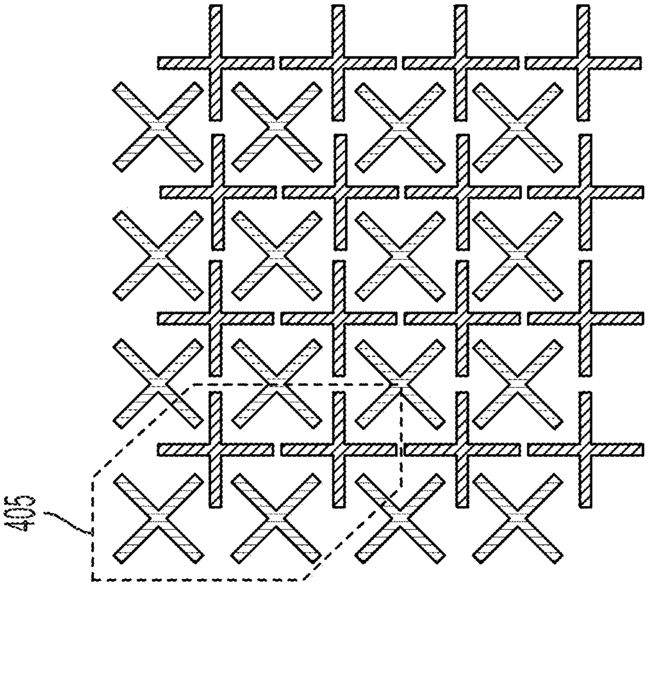
FIG. 4B is a diagram illustrating an exemplary arrangement of first and second dipole types according to the disclosure.

FIG. 4B illustrates how a single signal and phase dipole cluster 405 may be integrated to form array 200.

Referring to FIG. 2, each column 205*a/b/c/d* may have five single signal and phase dipole clusters. The constituent single signal and phase dipole clusters 405 of a given column 205*a/b/c/d* are fed the same two RF signals (one per polarization) but each may have a different phase difference imparted by a corresponding phase shifter (not shown) so that the beam formed by the given column 205*a/b/c/d* may be tilted up and down in the vertical (y) axis.

Figure 5:
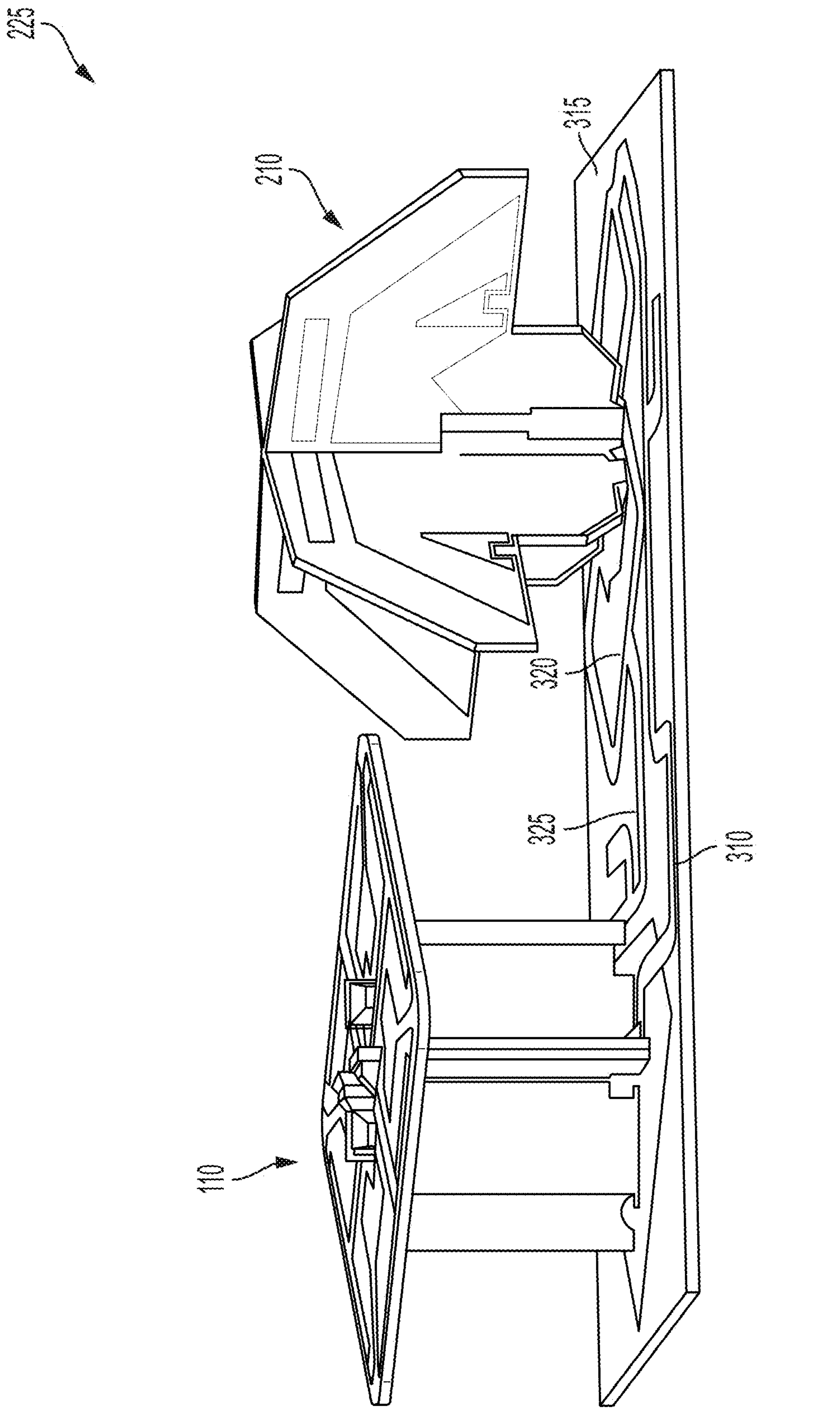
FIG. 5 is another view of exemplary hybrid dipole unit cell.

FIG. 5 further illustrates hybrid dipole unit cell 225. Shown are first dipole 110; second dipole 210, first feed 310, which splits at power divider 315; and second feed 325, which splits at power divider 330.

While the present disclosure has been described in terms of exemplary exemplary embodiments, those skilled in the art at the time this disclosure would know and appreciate that other exemplary embodiments are possible and within the spirit and understanding of this disclosure.

The invention claimed is:

1. A multiport antenna array, comprising:

a plurality of columns of hybrid dipole unit cells, each of the hybrid dipole unit cells having a first dipole of a first type, and a second dipole of a second type, wherein each of the first dipole of the first type and the second dipole of the second type, of each hybrid dipole unit cell, is configured to receive a first RF (radio frequency) signal of a single pair of RF signals and a second RF signal of the single pair of RF signals, the first and second RF signals corresponding to first and second orthogonal polarization states, respectively, and wherein the first dipole of the first type and the second dipole of the second type are spaced with an offset in a vertical direction.

2. The multiport antenna array of claim 1, wherein the first dipole of the first type and the second dipole of the second type, of each hybrid dipole unit cell, is configured to operate in a single frequency band.

3. The multiport antenna array of claim 2, wherein the single frequency band comprises a C-Band.

4. The multiport antenna array of claim 2, wherein each of the hybrid dipole unit cells comprises:

a first signal feed coupled to a first dipole arm of the first dipole of the first type and coupled to a first power divider; and a second signal feed coupled to a second dipole arm of the first dipole of the first type and coupled to a second power divider.

5. The multiport antenna array of claim 4, wherein the first signal feed carries the first RF signal of the single pair of RF signals, and wherein the second signal feed carries the second RF signal of the single pair of RF signals.

6. The multiport antenna array of claim 5, wherein the first power divider is coupled to a first longer trace branch, wherein the first longer trace branch is coupled to a first side of a horizontal stem plate of the second dipole of the second type, and wherein the first power divider is coupled to a first shorter trace branch, wherein the first shorter trace branch is coupled to a second side of the horizontal stem plate of the second dipole of the second type.

7. The multiport antenna array of claim 6, wherein the second power divider is coupled to a second longer trace branch, wherein the second longer trace branch is coupled to a first side of a vertical stem plate of the second dipole of the second type, and wherein the second power divider is coupled to a second shorter trace branch, wherein the second shorter trace branch is coupled to a second side of the vertical stem plate of the second dipole of the second type.

8. The multiport antenna array of claim 1, wherein the hybrid dipole unit cells, of each of the plurality of columns of hybrid dipole unit cells, are arranged into a plurality of single signal and phase dipole clusters, each single signal and phase dipole cluster comprising at least two hybrid dipole unit cells; and wherein the pair of RF signals have a single phase.

9. The multiport antenna array of claim 1, wherein the hybrid dipole unit cells, of each of the plurality of columns of hybrid dipole unit cells, are arranged into a plurality of single signal and phase dipole clusters, each single signal and phase dipole cluster comprising at least two hybrid dipole unit cells; and wherein the first and second RF signals that make up the pair of RF signals associated with at least one of the plurality of single signal and phase dipole clusters have a different amplitude and phase.

10. The multiport antenna array of claim 9 further comprising:

a remote electrical tilt mechanism configured to control the amplitude and phase of the first and second RF signals of the pair of RF signals associated with the at least one of the plurality of single signal and phase dipole clusters and electrically steer, in the vertical direction, an antenna beam associated with the at least one of the plurality of single signal and phase dipole clusters.

11. A multiport antenna array, comprising:

a plurality of dipole columns, each dipole column having a first sub-column having first dipoles of a first type and a second sub-column having second dipoles of a second type, wherein the first dipoles of the first type and the second dipoles of the second type are configured to radiate in a first frequency band, wherein the first dipoles of the first type within a corresponding first sub-column and the second dipoles of the second type within a corresponding second sub-column are coupled to a common signal source, wherein the first dipoles in the first sub-column and the second dipoles in the second sub-column have a spatial offset in a vertical direction.

12. The multiport antenna array of claim 11, wherein the common signal source comprises:

a first signal corresponding to a first polarization; and a second signal corresponding to a second polarization.

13. The multiport antenna array of claim 11, wherein the first dipoles of the first type in the first sub-column have a first physical configuration and the second dipoles of the second type in the second sub-column have a second physical configuration different from the first physical configuration.

* * * * *